United States Patent
Hoch et al.

(10) Patent No.: US 12,248,436 B2
(45) Date of Patent: Mar. 11, 2025

(54) DISTRIBUTED MANAGEMENT OF FILE MODIFICATION-TIME FIELD

(71) Applicant: Google LLC, Mountain View, CA (US)

(72) Inventors: Ezra N. Hoch, Tel-Aviv (IL); Eli Weissbrem, Rehovot (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/366,312

(22) Filed: Aug. 7, 2023

(65) Prior Publication Data

US 2023/0385239 A1  Nov. 30, 2023

Related U.S. Application Data

(63) Continuation of application No. 18/149,752, filed on Jan. 4, 2023, now Pat. No. 11,755,538, which is a continuation of application No. 16/944,098, filed on Jul. 30, 2020, now Pat. No. 11,556,503, which is a continuation of application No. 15/259,071, filed on Sep. 8, 2016, now Pat. No. 10,733,147.

(60) Provisional application No. 62/243,154, filed on Oct. 19, 2015.

(51) Int. Cl.
*G06F 16/17* (2019.01)
*G06F 16/11* (2019.01)
*G06F 16/176* (2019.01)
*G06F 16/18* (2019.01)

(52) U.S. Cl.
CPC .......... *G06F 16/1734* (2019.01); *G06F 16/11* (2019.01); *G06F 16/1767* (2019.01); *G06F 16/1847* (2019.01)

(58) Field of Classification Search
None
See application file for complete search history.

(56) References Cited

U.S. PATENT DOCUMENTS

| | | | |
|---|---|---|---|
| 7,693,886 B1 | 4/2010 | Novick et al. | |
| 8,041,735 B1* | 10/2011 | Lacapra | G06F 16/182 707/783 |
| 2007/0239806 A1* | 10/2007 | Glover | G06F 16/184 |
| 2009/0094236 A1* | 4/2009 | Renkes | G06F 16/2272 |
| 2011/0202546 A1* | 8/2011 | Amit | H04L 67/1097 707/755 |
| 2012/0005203 A1* | 1/2012 | Brzozowski | G06F 16/9536 707/E17.014 |
| 2015/0278397 A1* | 10/2015 | Hendrickson | G06F 16/9024 707/798 |
| 2015/0324386 A1* | 11/2015 | Calder | G06F 16/176 707/649 |

(Continued)

*Primary Examiner* — Christopher J Raab
(74) *Attorney, Agent, or Firm* — Honigman LLP; Brett A. Krueger

(57) ABSTRACT

A method for data storage includes assigning multiple different portions of a given object, which is stored in non-volatile storage, for access by multiple respective software modules running on one or more processors. Storage operations are performed by the software modules in the portions of the given object. Respective local values, which are indicative of most recent times the storage operations were performed in the given object by the respective software modules, are updated by the software modules. A global value is updated for the given object, by consolidating updates of the local values performed by the software modules.

20 Claims, 2 Drawing Sheets

(56) References Cited

U.S. PATENT DOCUMENTS

2015/0371637 A1* 12/2015 Neubacher ........... G11B 27/031
                                                  704/235
2016/0147813 A1*  5/2016 Lee .................... G06F 16/2365
                                                  707/703
2016/0321288 A1* 11/2016 Malhotra ............ G06F 16/1748
2016/0371296 A1* 12/2016 Passey ................ G06F 16/185
2017/0339243 A1* 11/2017 Balafoutis ............ H04L 67/561

* cited by examiner

US 12,248,436 B2

DISTRIBUTED MANAGEMENT OF FILE MODIFICATION-TIME FIELD

CROSS REFERENCE TO RELATED APPLICATIONS

This U.S. Patent Application is a continuation of, and claims priority under 35 U.S.C. § 120 from, U.S. patent application Ser. No. 18/149,752, filed on Jan. 4, 2023, which is a continuation of U.S. patent application Ser. No. 16/944,098, now U.S. Pat. No. 11,556,503, filed on Jul. 30, 2020, which is a continuation of U.S. patent application Ser. No. 15/259,071, now U.S. Pat. No. 10,733,147, filed on Sep. 8, 2016, which claims priority under 35 U.S.C. § 119(e) to U.S. Provisional Application 62/243,154, filed on Oct. 19, 2015. The disclosures of these prior applications are considered part of the disclosure of this application and are hereby incorporated by reference in their entireties.

TECHNICAL FIELD

The present disclosure relates generally to data storage, and particularly to methods and systems for managing metadata of files or other objects.

BACKGROUND

User applications and operating systems typically store data in files. Various types of File Systems (FSs) that manage storage of files are known in the art. In addition to file content, FSs typically store relevant metadata, such as the file creation time and most-recent access or modification time.

SUMMARY

An embodiment of the present disclosure that is described herein provides a method for data storage. The method includes assigning multiple different portions of a given object, which is stored in non-volatile storage, for access by multiple respective software modules running on one or more processors. Storage operations are performed by the software modules in the portions of the given object. Respective local values, which are indicative of most-recent times the storage operations were performed in the given object by the respective software modules, are updated by the software modules. A global value is updated for the given object, by consolidating updates of the local values performed by the software modules.

In some embodiments, the storage operations include write operations that modify content of the given object, and the local values and the global values include modification-time (mTime) values that are indicative of most-recent times the content of the given object was modified. In an embodiment, updating the local modification-time values includes temporarily storing the updated local modification-time values together with a corresponding modified content in the non-volatile storage.

The method may further include generating and storing a snapshot of the given object that includes the modified content, and deleting the temporarily-stored updated local modification-time values from the non-volatile storage. In some embodiments, upon recovery from a failure, the method includes determining a count of currently-open write operations to the given object, and setting the global modification-time to an updated value depending on the count.

In some embodiments, updating the global value includes receiving from a software module a notification indicative of an updated local value, and: when the updated local value is greater than the global value, replacing the global value with the updated local value; and when the updated local value is not greater than the global value, incrementing the global value by a predefined increment. In an embodiment, the predefined increment is a finest-resolution increment in a format of the global value. In an embodiment, upon recovery from a failure, the global modification-time is set to an updated value depending on the predefined increment.

In some embodiments, the storage operations include read and write operations, and the local values and the global values include access-time (aTime) values that are indicative of most-recent times the given object was accessed.

There is an embodiment additionally provided, in accordance with of the present disclosure, a computing system including a non-volatile storage and one or more processors. The one or more processors are configured to assign multiple different portions of a given object, which is stored in the non-volatile storage, for access by multiple respective software modules running on the one or more processors, to perform storage operations in the portions of the given object by the software modules, to update, by the software modules, respective local values that are indicative of most-recent times the storage operations were performed in the given object by the respective software modules, and to update a global value for the given object, by consolidating updates of the local values performed by the software modules.

There is also provided, in accordance with an embodiment of the present disclosure, a computer software product, the product including a tangible non-transitory computer-readable medium in which program instructions are stored, which instructions, when read by one or more processors, cause the one or more processors to assign multiple different portions of a given object, which is stored in the non-volatile storage, for access by multiple respective software modules running on the one or more processors, to perform storage operations in the portions of the given object by the software modules, to update, by the software modules, respective local values that are indicative of most-recent times the storage operations were performed in the given object by the respective software modules, and to update a global value for the given object, by consolidating updates of the local values performed by the software modules.

The present disclosure will be more fully understood from the following detailed description of the embodiments thereof, taken together with the drawings in which:

DETAILED DESCRIPTION

Figure 1:
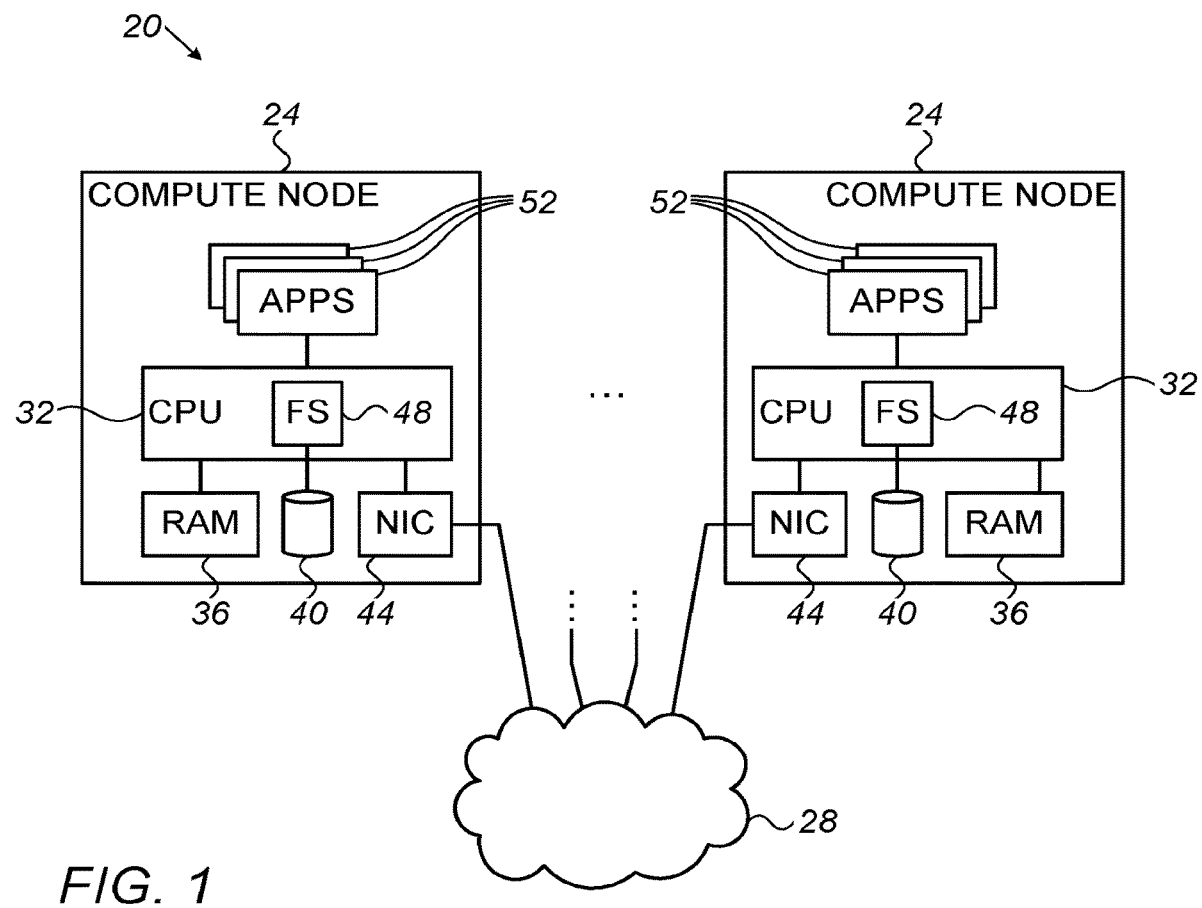
FIG. 1 is a block diagram that schematically illustrates a computing system, in accordance with an embodiment of the present disclosure.

Embodiments of the present disclosure that are described herein provide improved methods and systems for managing a modification-time ("mTime") value of a file. In the disclosed embodiments, a File System (FS) stores files in persistent, non-volatile storage. For a given file, the FS runs a software entity that "owns" the file, and enables multiple software entities, referred to as "mappers," to access and modify the file concurrently. Among other tasks, the mappers and owner update the mTime value of the file in a manner that continually reflects the actual latest modification time, and is resilient to sudden power failures.

In some embodiments, each mapper maintains a local mTime value, which is indicative of the most recent time the file was modified by that particular mapper. In addition to the multiple local mTime values, the owner maintains a global mTime value that is indicative of the most recent time the file was modified by any of the mappers. The global mTime value is the value that is typically exposed to external applications and serves as the mTime value of the file.

When a certain mapper modifies the content of file, the mapper updates its local mTime value to reflect the modification time. The mapper writes the updated local mTime value together with the modified content to the non-volatile storage, e.g., using "piggyback journaling" or other suitable journaling scheme. In addition, the mapper sends a request to the owner to update the global mTime value. This local updating process is typically performed by the various mappers in parallel and without mutual coordination. The mapper typically updates the local mTime value after obtaining a lock on the relevant portion of the file. This lock, however, is local, and does not prevent other mappers from performing similar updates simultaneously in other portions of the file.

When the mappers operate in the above-described manner, the owner receives multiple uncoordinated requests from various mappers to update the global mTime value of the file. Upon receiving each request, the owner checks whether the local mTime value in the request is larger than the current global mTime value. If so, the owner replaces the global mTime value with the local mTime value indicated in the request.

Otherwise (i.e., if the local mTime value in the request is smaller than or equal to the current global mTime value), the owner increments the global mTime value by a predefined small increment denoted $\Delta$, e.g., by a 1 nS tick. Incrementing of this sort maintains the global mTime value monotonically increasing, retains consistency, and mitigates scenarios in which multiple mappers request updates having the same local mTime values. The increment may cause some inaccuracy in the mTime value, but it is typically small enough to be tolerable in most applications.

In some embodiments, upon recovery from sudden power failure, the owner counts the number of write operations to the file that are currently open. The owner then sets the global mTime value to $MAX+(N-1)\cdot\Delta$, wherein N denotes the number of open write operations, MAX denotes the largest (i.e., the latest) of the local mTime values journaled in the open write operations before the power failure, and $\Delta$ denotes the predefined small increment.

When using the disclosed technique, the FS updates the mTime value of the file continually, even when the file is being modified by multiple uncoordinated writers, and practically without causing any centralized bottleneck that limits scalability or write performance. Since the disclosed technique does not require any kind of locking mechanism on the global mTime value, higher parallelism and higher performance and scalability are achieved. Resilience to sudden power failure is also maintained.

The disclosed technique is suitable for implementation in distributed, network-based FSs, as well as in centralized FSs that run on a single compute node. Generalizations to other file attributes, e.g., access-time ("aTime"), and to attributes of other objects, such as directories, are also described.

System Description

FIG. 1 is a block diagram that schematically illustrates a computing system 20, in accordance with an embodiment of the present disclosure. System may include, for example, a data center, a cloud computing system or a computing system that performs any other suitable function.

System 20 includes multiple compute nodes 24 that communicate with one another over a computer communication network 28 Compute nodes 24 are referred to herein as nodes, for brevity, and may include, for example, servers, workstations or any other suitable type of compute node. Nodes 24 may communicate over network 28 in accordance with any suitable network communication protocol, such as Ethernet or Infiniband. System 20 may include any suitable number of compute nodes of any type. Nodes 24 may be collocated or located in multiple geographical locations. The collection of nodes 24 is also sometimes referred to as a cluster.

In the present example, each node 24 includes a Central Processing Unit (CPU) 32, also referred to as a processor. Each node also includes a volatile memory 36 such as Random Access Memory (RAM), and non-volatile storage 40 such as one or more Solid State Drives (SSDs) or Hard Disk Drives (HDDs). Each node 24 further includes a network interface 44 such as a Network Interface Controller (NIC) for communicating over network 28. CPU 32 of each node 24 runs one or more software applications 52, e.g., user applications, Virtual Machines (VMs), operating system processes or containers, and/or any other suitable software.

In some embodiments, each CPU 32 runs a respective File System (FS) module 48 that carries out various file management functions. The plurality of modules 48, running on CPUs 32 of nodes 24, implement a distributed FS that manages the storage of files in the various non-volatile storage devices 40. This distributed FS typically serves the various applications 52 using a suitable storage protocol such as Network File System (NFS) or Server Message Block (SMB).

The distributed FS formed by the collection of modules 48 uses the various storage devices 40 of the various nodes 24 (and/or storage devices 40 that do not belong to the nodes) as a system-wide pool of persistent, non-volatile storage. Certain aspects of distributed FS operation are addressed in U.S. Patent Application Publication 2016/0203219, entitled "Distributed File System for Virtualized Computing Clusters," which is assigned to the assignee of the present patent application and whose disclosure is incorporated herein by reference.

The configurations of system 20 and nodes 24 shown in FIG. 1 are example configurations that are chosen purely for the sake of conceptual clarity. In alternative embodiments, any other suitable system and/or node configuration can be used. For example, one or more of storage devices 40 may be separate from nodes 24, e.g., connected to network 28 individually or via some storage controller. As another example, some or even all of the functionality of modules 48 may be implemented on one or more processors that are separate from nodes 24. The different elements of system 20 and nodes 24 may be implemented using suitable hardware, using software, or using a combination of hardware and software elements. In some embodiments, CPUs 32 include general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Distributed Updating of File Modification Time by Multiple Mappers

For a given file, the distributed FS of system 20 runs a software entity that is responsible for managing the file. This software entity is referred to herein as the "owner" of the file. The distributed FS enables multiple entities, referred to as "mappers," to access and modify the file concurrently. The owner typically permits each mapper to modify a respective portion of the file, and ensures that no two mappers are permitted to modify the same portion simultaneously.

The mappers may include, for example, different applications 52 that possibly run on different nodes 24, different processes within a given application 52, or any other suitable software module that modifies the content of files. The mappers usually operate without coordination with one another.

The owner of a file, the mappers that modify the file, and the distributed FS as a whole, all run on CPUs 32 of nodes 24. For the sake of clarity, the description that follows refers mainly to "owner," "mappers" and "distributed FS," rather than to the underlying CPUs that run them. Nevertheless, the disclosed methods are ultimately carried out by one or more of CPUs 32. Generally, the disclosed techniques may be carried out by any suitable number of processors, or even by a single processor.

Among other tasks, the distributed FS of system 20 maintains a modification-time ("mTime") value for each file. The mTime value typically includes a numerical value that is indicative of the most recent time the file content was modified. The mTime value is also referred to as a "global" mTime value, in order to distinguish from local mTime values described below. The mTime value is typically stored in a suitable field in the file metadata. In the embodiments described herein, the mTime value is a 64-bit binary word that represents the most recent modification time with 1 nS resolution. Alternatively, however, any other suitable format, e.g., 32-bit format, can be used.

The global mTime value can be used by the FS, or by applications that use the file, for any suitable purpose. For example, when the file in question is part of a software project that includes multiple files, a build system tool may check the global mTime values of the various files in order to decide which files have changed and should be included in re-building. As another example, an operating system or other software may sort documents or files according to their latest update time using the global mTime values. A backup system may use the global mTime value to check whether a file was modified before archiving it. A security system may use the global mTime value to perform security auditing, e.g., detect whether and when a file was manipulated. Additionally or alternatively, the global mTime values can be used in any other suitable way for any other suitable purpose.

The description that follows refers to mTime value management of a single file, for the sake of clarity. Real-life file systems, however, typically manage a large number of files. In such embodiments, the disclosed techniques may be applied per file.

As noted above, at a given point in time, the owner typically assigns different portions ("mappings") of the file to different mappers, and each mapper modifies the content in its respective assigned portion of the file. Each mapper maintains and updates a respective 'local mTime value," which is indicative of the most recent time the file was modified by that particular mapper. The owner consolidates the local mTime values reported by the mappers, so as to produce and continuously update the global mTime value for the entire file.

Figure 2:
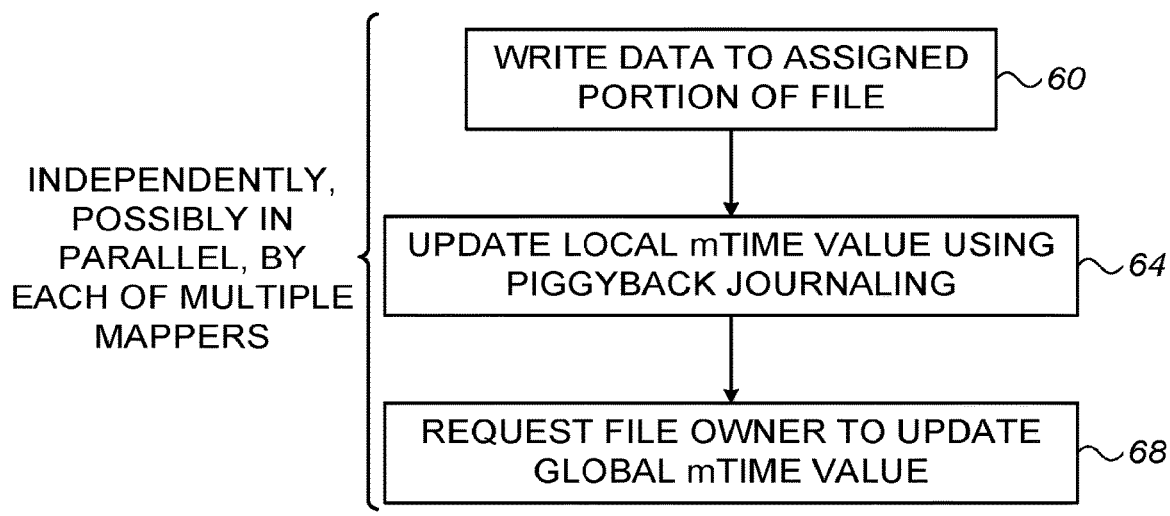
FIGS. 2 and 3 are flow charts that schematically illustrate methods for distributed updating of file mTime value, in accordance with an embodiment of the present disclosure.
Figure 3:
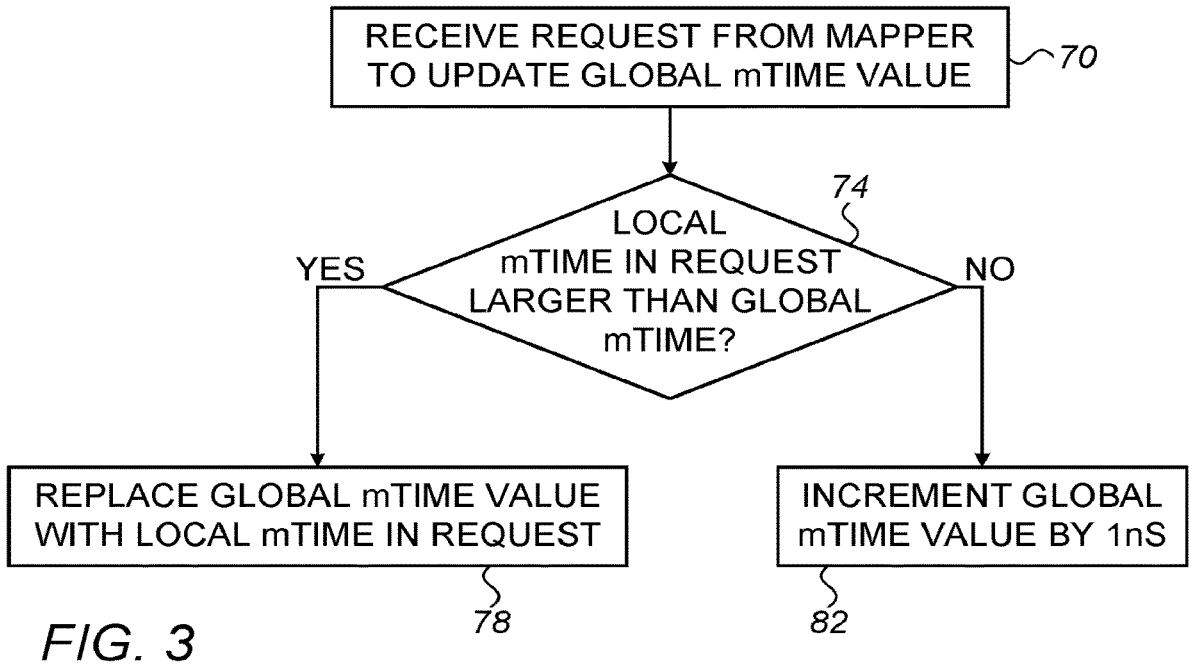

FIG. 2 is a flow chart that schematically illustrates a method of updating the local mTime value by a mapper, in accordance with an embodiment of the present disclosure. The method of FIG. 2 is typically carried out by the various mappers, whenever a mapper writes to the file, possibly in parallel and without coordination with one another. FIG. 3 below describes the process of consolidating these local updates by the owner, for updating the global mTime value.

The method of FIG. 2 begins with a mapper writing data to its assigned portion of the file, at a writing step 60. The mapper sets its local mTime value to the time at which the write operation of step 60 took place, at a local updating step 64. In some embodiments, the mapper stores the updated local mTime value together with the updated portion of the file in the non-volatile storage, in a dedicated journaling record. This sort of updating is referred to as "piggyback journaling."

In these embodiments, the distributed FS occasionally (e.g., periodically) scans the dedicated journaling records of the file, combines the updates recorded in the records to produce an updated copy ("snapshot") of the file, stores the snapshot in the non-volatile storage, and erases the (now obsolete) journaling records.

It should be noted, however, that the use of piggyback journaling is not mandatory. In alternative embodiments, the mapper may store the updated local mTime value in the non-volatile storage using any other suitable scheme.

At a global update requesting step 68, the mapper initiates an update of the global mTime value by sending an update request to the owner. The request requests the owner to update the global mTime value to reflect the update of the local mTime value. Among other possible attributes, the request indicates the updated local mTime value.

FIG. 3 is a flow chart that schematically illustrates a method of updating the global mTime value by the owner of the file, in response to updates of the local mTime values by the mappers, in accordance with an embodiment of the present disclosure.

The method of FIG. 3 begins with the owner receiving an update request from a certain mapper (e.g., the request sent at step 68 of FIG. 2 above), at a request reception step 70. At an mTime comparison step 74, the owner checks whether the local mTime value in the request is larger than the current global mTime value. If so, the owner sets the global mTime value to the local mTime value specified in the request, at a global updating step 78.

Otherwise (i.e., if the local mTime value in the request is smaller than or equal to the current global mTime value), the owner increments the global mTime value by a predefined small increment, at a global incrementing step 82. Typically, the increment is chosen to be the finest-resolution step possible in the format used for representing the mTime values. In the present example, the predefined increment is 1 nS. Alternatively, however, any other suitable increment size can be used.

The method of FIG. 3 is typically repeated by the owner upon receiving each update request from one of the mappers.

Incrementing the global mTime value in response to every update is important for maintaining the global mTime value monotonically increasing, for retaining consistency, and for mitigating scenarios in which multiple mappers request update their local mTime values simultaneously.

Figure 4:
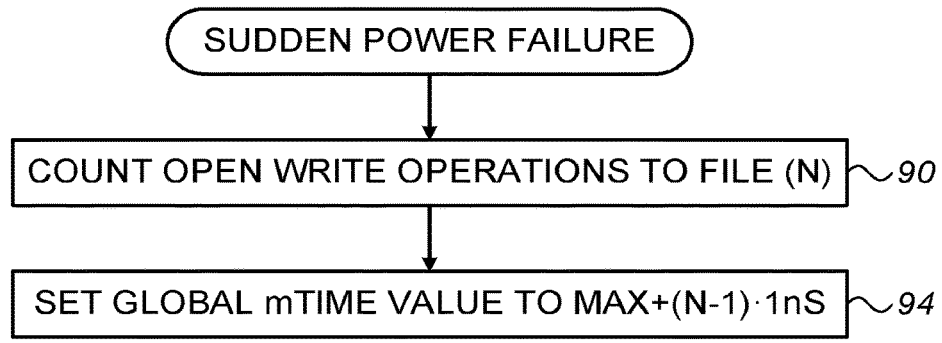
FIG. 4 is a flow chart that schematically illustrates a method for recovering file mTime value following sudden power failure, in accordance with an embodiment of the present disclosure.

FIG. 4 is a flow chart that schematically illustrates a method for recovering the global mTime value following sudden power failure, in accordance with an embodiment of the present disclosure. When recovering from a sudden power failure, the owner counts the number of write operations to the file that are still open, i.e., the number of write operations to the file that were in progress at the time the power failure occurred, at a counting step 90. This number is denoted N.

The owner then reads the last-recorded global mTime value from the non-volatile storage, and increments it depending on N and on the predefined increment α defined above, at a global recovery step 94. In the present embodiment, Δ=1 nS, and the owner sets the global mTime value to be MAX+(N−1)·1 nS, wherein MAX denotes the largest (and thus the latest) among the local mTime values journaled in the open write operations before the power failure. In alternative embodiments, the owner may set the global mTime value to any other suitable function of N and/or Δ. The owner stores the new global mTime value to the non-volatile storage.

Although the embodiments described herein refer mainly to write operations and modification-time values of files, the disclosed techniques can also be used with other suitable storage operations, and for managing other suitable file attributes. For example, the distributed FS can use the disclosed techniques for updating the access time values ("aTime") of files. The aTime value of a file is indicating of the most recent time the file was accessed (read or written, not necessarily written as the mTime value). In some embodiments, when using the disclosed techniques to manage aTime value, it is not mandatory to increment the global aTime value if the local aTime value in a request is not larger. In other words, steps 74 and 82 of FIG. 2 can be omitted.

Although the embodiments described herein refer mainly to managing attributes of individual files, the disclosed techniques can alternatively be used for managing attributes (e.g., mTime or aTime) of other suitable objects, for example groups of files or entire directories.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:

1. A computer-implemented method when executed on data processing hardware causes the data processing hardware to perform operations comprising:
   exposing a global file modification time value associated with a file to a plurality of applications, the global file modification time value representing a first point in time the file was most recently modified;
   receiving, from a respective one of the applications from the plurality of applications, an update request comprising a local file modification time value representing a second point in time the respective one of the applications performed a storage operation on the file;
   determining that the local file modification time value is less than or equal to the global file modification time value;
   based on determining that the local file modification time value is less than or equal to the global file modification time value, incrementing the global file modification time value by a predefined fixed increment value, the predefined fixed increment value increasing the global file modification time value by a predefined fixed amount of time; and
   exposing the incremented global file modification time value to the plurality of applications.

2. The computer-implemented method of claim 1, wherein each respective application of the plurality of applications maintains a corresponding local modification time value representing when the respective application most recently modified the file.

3. The computer-implemented method of claim 1, wherein the operations further comprise, upon recovering from a failure:
   determining a number of currently-open storage operations to the file; and
   updating the global file modification time value based on the number of currently-open storage operations.

4. The computer-implemented method of claim 3, wherein the failure comprises a power failure.

5. The computer-implemented method of claim 1, wherein the storage operation comprises a read operation.

6. The computer-implemented method of claim 1, wherein the storage operation comprises a write operation.

7. The computer-implemented method of claim 1, wherein the predefined fixed increment value comprises a finest-resolution increment in a format of the global file modification time value.

8. The computer-implemented method of claim 7, wherein the finest-resolution increment comprises one nanosecond.

9. The computer-implemented method of claim 1, wherein the plurality of applications execute at a plurality of nodes.

10. The computer-implemented method of claim 1, wherein the operations further comprise storing the file using a Network File System or a Server Message Block.

11. A system comprising:
   data processing hardware; and
   memory hardware in communication with the data processing hardware, the memory hardware storing instructions that when executed on the data processing hardware cause the data processing hardware to perform operations comprising:
      exposing a global file modification time value associated with a file to a plurality of applications, the global file modification time value representing a first point in time the file was most recently modified;

receiving, from a respective one of the applications from the plurality of applications, an update request comprising a local file modification time value representing a second point in time the respective one of the applications performed a storage operation on the file;

determining that the local file modification time value is less than or equal to the global file modification time value;

based on determining that the local file modification time value is less than or equal to the global file modification time value, incrementing the global file modification time value by a predefined fixed increment value, the predefined fixed increment value increasing the global file modification time value by a predefined fixed amount of time; and exposing the incremented global file modification time value to the plurality of applications.

12. The system of claim 11, wherein each respective application of the plurality of applications maintains a corresponding local modification time value representing when the respective application most recently modified the file.

13. The system of claim 11, wherein the operations further comprise, upon recovering from a failure:

determining a number of currently-open storage operations to the file; and updating the global file modification time value based on the number of currently-open storage operations.

14. The system of claim 13, wherein the failure comprises a power failure.

15. The system of claim 11, wherein the storage operation comprises a read operation.

16. The system of claim 11, wherein the storage operation comprises a write operation.

17. The system of claim 11, wherein the predefined fixed increment value comprises a finest-resolution increment in a format of the global file modification time value.

18. The system of claim 17, wherein the finest-resolution increment comprises one nanosecond.

19. The system of claim 11, wherein the plurality of applications execute at a plurality of nodes.

20. The system of claim 11, wherein the operations further comprise storing the file using a Network File System or a Server Message Block.

* * * * *